United States Patent [19]

Semler, Jr.

[11] 4,435,908
[45] Mar. 13, 1984

[54] OFFSET, EXTENDABLE, QUICK-RELEASE PLUMBNESS INDICATING APPARATUS

[76] Inventor: Paul M. Semler, Jr., 3045 N. Dodge Blvd., Tucson, Ariz. 85716

[21] Appl. No.: 451,726

[22] Filed: Dec. 20, 1982

[51] Int. Cl.³ .............................................. G01C 9/00
[52] U.S. Cl. ...................................... 33/376; 33/374; 33/384
[58] Field of Search ................. 33/376, 374, 370, 371, 33/384, 194

[56] References Cited

U.S. PATENT DOCUMENTS

| | | | |
|---|---|---|---|
| 2,502,232 | 3/1950 | Oscar | 33/370 |
| 2,512,654 | 6/1950 | Kennedy | 33/384 |
| 2,535,791 | 12/1950 | Fluke | 33/376 |
| 3,311,988 | 4/1967 | Manville | 33/376 |
| 3,311,989 | 4/1967 | Manville | 33/376 |
| 3,568,319 | 3/1971 | Mou | 33/376 |
| 3,859,002 | 1/1975 | Jamey | 33/370 |
| 4,395,829 | 8/1983 | Loftus | 33/374 |

FOREIGN PATENT DOCUMENTS 1185590  3/1970  United Kingdom .................. 33/374

Primary Examiner—Willis Little
Attorney, Agent, or Firm—Cahill, Sutton & Thomas

[57] ABSTRACT

An apparatus for measuring the plumbness of vertical studs of building structure frames includes a vertical main body member with a horizontal vial therein and having first and second opposed, plane, parallel surfaces, first and second vertical extension members being connected to said main body member and slidably engaging said first and second plane, parallel surfaces, respectively, first and second quick-release mechanisms releasably locking said first and second vertical extension members to said main body member, a first offset member connected to the upper end of the first vertical extension member and extending to an imaginary plane that is parallel to the first surface, and a second offset member extending from the bottom of the second vertical extension member to the imaginary plane. The device is rapidly extensible to any length up to nearly three times the length of the main body member in order to allow a worker to quickly plumb an outwardly warped stud by aligning the first and second offset members against the upper and lower ends of the stud.

13 Claims, 6 Drawing Figures

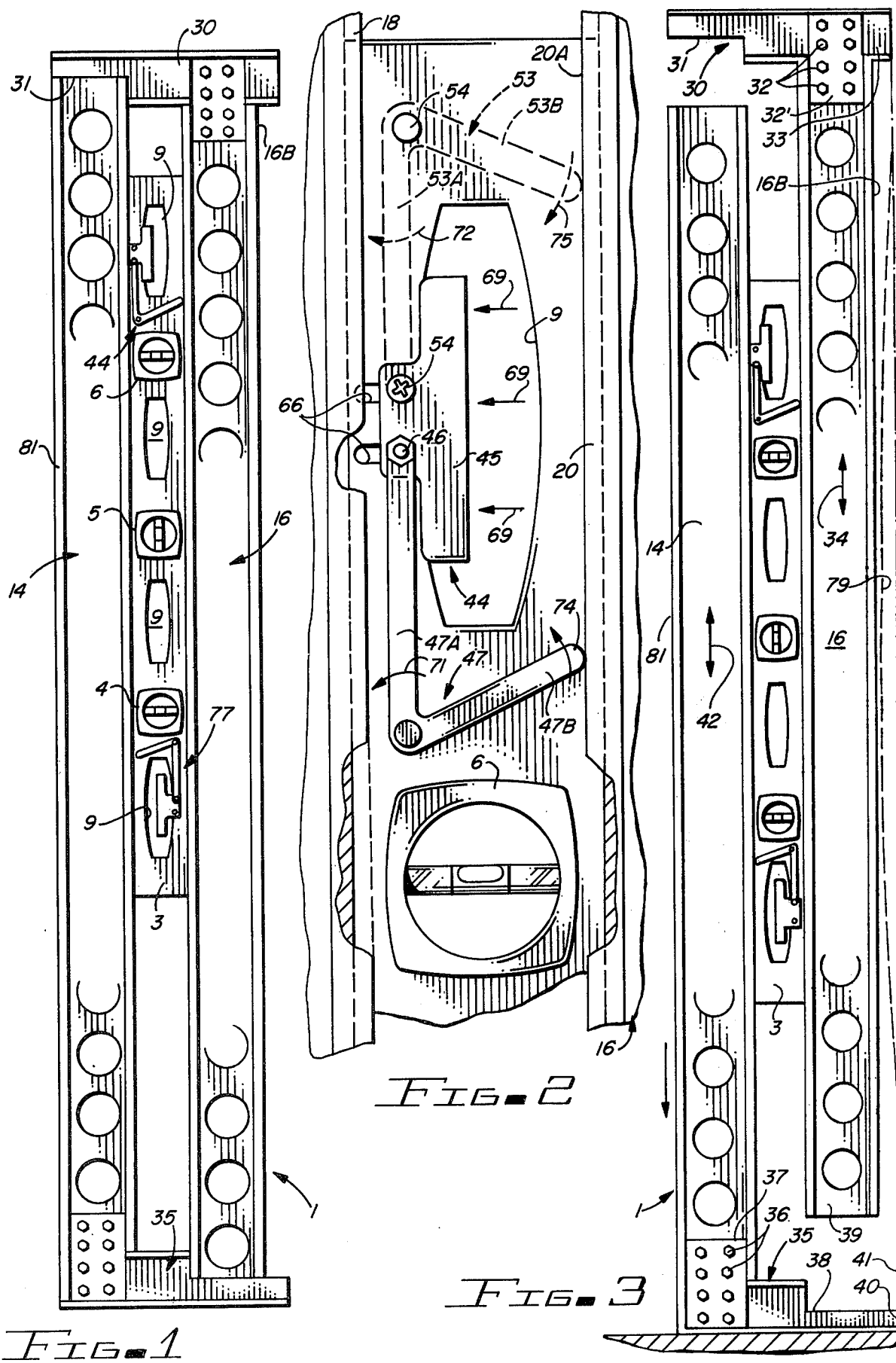

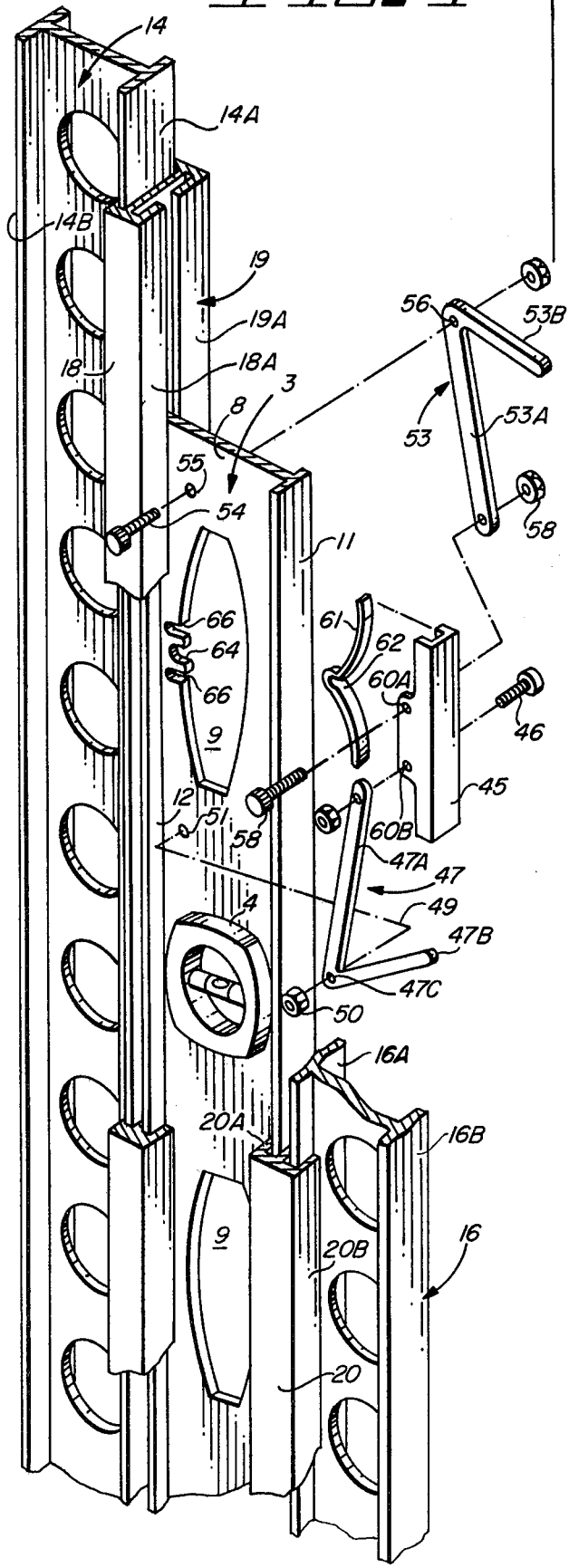
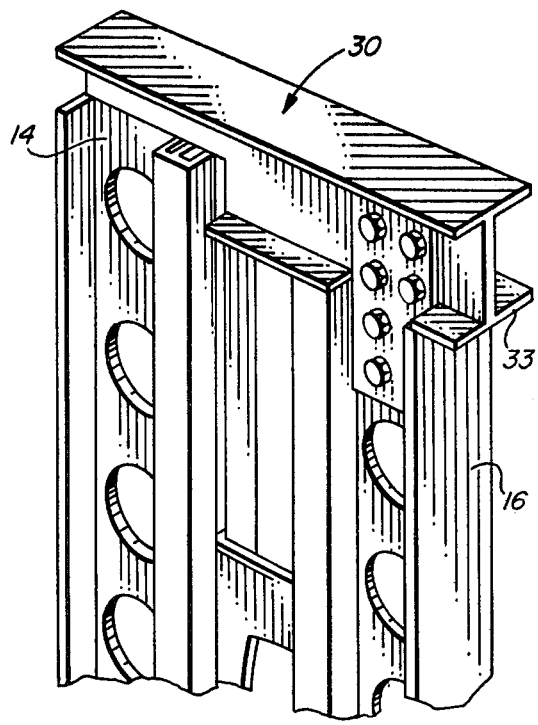
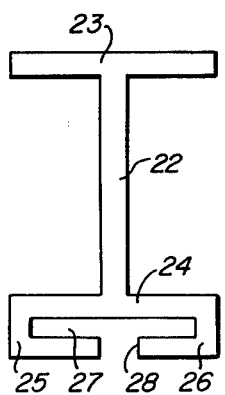

OFFSET, EXTENDABLE, QUICK-RELEASE PLUMBNESS INDICATING APPARATUS

BACKGROUND OF THE INVENTION

The invention relates to devices and methods for making plumbness measurements of building frame structures, especially when the measurements must be made of the plumbness of bowed or warped vertical studs of the frame structures and when the vertical studs are of various lengths.

By way of background, those skilled in the art of constructing building frames know that the studs of framed walls are rarely truly vertical immediately after the frames are erected. The studs therefore must be measured and adjusted for "plumbness", or true "verticalness". The typical approach of erecting frame walls is to utilize premarked horizontal lower plates that are attached to the top of the foundation or floor structure. The lower ends of the vertical studs are attached to the lower plates at the spaced, premarked locations thereof. The upper ends of the studs are attached to similarly spaced, premarked locations of a horizontal (or, in some cases, sloped, "top plate". The frame wall is temporarily held in place by braces". The studs may be of the same or varying lengths, depending on the type of roof structure utilized. In any case, the studs, whether they are of metal or wood, but especially if they are of wood, are rarely perfectly straight, and they are rarely perfectly vertical. One reason the studs are rarely vertical is non-levelness of the floor or foundation to which the bottom premarked plates are attached. Furthermore, even if wood studs are initially straight, a few hours of exposure to sunlight usually causes them to warp, sometimes severely. This warpage makes it difficult for a worker to subsequently make measurements indicative of the plumbness of individual studs and of the framed wall as a whole. Nevertheless, the plumbness must be measured and adjustments of the "verticalness" of the measured studs and the wall must be made in the most efficient and accurate way that is practical, because otherwise numerous difficulties will be encountered in subsequent construction of the building.

If a typical carpenter's level having flat, parallel opposed edge surfaces and also having both a horizontal bubble vial and a vertical bubble vial is used, a number of difficulties may be encountered. Usually, the carpenter's level is considerably shorter than the studs which must be measured in order to adjust plumbness. To measure plumbness of a warped stud, the flat edge surface of the carpenter's level must be placed against either the convex or the concave surface of the warped stud. Those skilled in the art know that the resulting measurements and adjustments of plumbness of the warped stud is therefore based on "guesswork" as to against which portion of the warped stud the relatively short carpenter's level should be abutted to obtain an accurate indication of the stud's plumbness. Due to the inherent inaccuracy of this approach, the common practice is for the worker whose responsibility it is to measure plumbness to find the straightest unused stud of the needed length that he can and nail two equal thickness blocks to the upper and lower ends respectively, of that stud. In order to make the needed plumbness measurement, the worker then holds the nailed-on block of the modified stud against the end points of the stud to be plumbed. He then holds a flat edge surface of the carpenters level against the straight stud.

Although this technique provides the needed accuracy of measurement, it is quite inconvenient, especially if no adequately straight stud can be found. Furthermore, if the roof structure of the building under construction is of the type sometimes referred to as a "shed roof", the studs of a wall may be all of different lengths. In this case, it is obviously inconvenient and impractical to use the above technique. However, it may be difficult to obtain accurate plumbing measurements without making a number of the above-described makeshift devices.

It is clear that the unavailability of a readily made, easily used, extendable length plumbing device results in inefficient use of workers' time in constructing and using the above makeshift devices, and also leads to imprecision in the plumbness of the walls of the completed structure and lower than desirable quality of construction.

A variety of plumbing tools and aids are known, including those disclosed in U.S. Pat. Nos. 686,360; 3,328,887; 1,780,344; 945,275 which are listed in order of decreasing relevance to the present invention. U.S. Pat. No. 686,360 discloses an extendable device with two offset elements 10 attached to members that are respectively extendable from opposite ends of the main body, which includes a vial for making plumb measurements. This device is of rather imprecise construction, and is extendable to a length that is only less than twice the length of the main body. Furthermore, the device does not have a flat edge surface that is useful for simultaneously making flatness, as well as plumbness measurements. But those skilled in the art know that both types of measurements must be made in "plumbing up" a newly erected frame structure, especially in "plumbing up" and shimming door jambs. Typically, a prefabricated door is perfectly rectangular, but a door jamb erected in a frame structure usually is not straight, and instead is warped in one or two directions, and it also usually is "out of plumb" in one or two directions. The device disclosed in U.S. Pat. No. 686,360 is not suitable for measuring both plumbness and flatness of door jambs. Furthermore, it is not easily extendable, because set screws must be loosened to allow extension of the device and then must be tightened to maintain the extended length. Furthermore, the device shown in U.S. Pat. No. 686,360 is not easily retrofittable to standard commercially available carpenter's levels.

It is clear that there is an unmet need for a single inexpensive, highly accurate device which can be used as a plumbness measurement tool that is easily and quickly extendable to many desired practical working lengths, is easily locked into an extended configuration, has a flat surface that enables accurate measurements of both flatness and plumbness, and is easily attachable to carpenter's levels of conventional design.

Accordingly, it is an object of the invention to provide an improved extendable apparatus for efficient working of plumbing measurements.

It is another object of the invention to provide an apparatus that makes it easy for a worker to quickly make plumbness measurements and flatness measurements to "plumb up" a frame structure of walls of a building before continuing further construction of the walls.

It is another object of the invention to provide a plumbing device which is extendable and has a quick release mechanism for allowing extension and locking of the device into an extended configuration or allows rapid collapsing of the extended device into a compact configuration.

It is another object of the invention to provide a device that is useful in making accurate plumbness measurements of warped studs and flatness measurements of door jambs.

SUMMARY OF THE INVENTION

Briefly described and in accordance with one embodiment thereof, the invention provides an apparatus and method for efficiently and accurately making measurements of the plumbness of warped vertical studs in a frame structure and also for making measurements of flatness and plumbness of door jambs, wherein the apparatus is conveniently extendable by means of a quick release locking mechanism from a compact configuration to a configuration of arbitrary length.

In the described embodiment of the invention, the device includes first and second vertical members each having a modified, I-beam shaped cross section, the inner end of which has a pair of groove-forming flanges in which the opposed parallel surfaces of a main body member are slideable. The main body member is a conventional carpenter's level which includes a bubble vial that is calibrated for aiding measurements of plumbness and a pair of quick-release locking mechanisms that normally engage both the main body member and respective ones of the first and second extension members to lock them to the main body member, but are releasable by means of handles to allow extension of the first and second members to a convenient length. A first offset member is attached to the end of the first vertical extension member and extends beyond the flat outer plate thereof to an imaginary plane that is parallel to the opposed parallel surfaces of the main body member. A second offset member extends from the bottom of the second vertical extension member horizontally outward to the surface of the imaginary plane. One or both of the extension members can be extended so that the upper and lower offset elements contact the top and bottom end portions of a warped stud that is to be "plumbed", so that the vial indicator indicates the plumbness of the major axis of the stud. In the described embodiment of the invention, the quick release locking mechanisms includes first and second dog members that are attached to the main body member and are spring loaded to engage the groove-forming flanges of the first and second extension members, respectively, to prevent sliding movement thereof relative to the main body member. Upon depressing of the first and second handles, the dogs move away from the groove-forming flanges, allowing extension or collapsing of the device. An outer surface of the second extension member is flat, allowing measurement of both flatness and plumbness of a door jamb.

BRIEF DESCRIPTION OF THE DRAWINGS

FIG. 1 is an elevation view of the extendable plumbness/flatness measuring device of the present invention.

FIG. 2 is an enlarged partial cutaway elevation view of the upper quick-release mechanism shown in the device of FIG. 1.

FIG. 3 is an elevation view illustrating partial extension of the device of FIG. 1.

FIG. 4 is a partial cutaway perspective exploded view useful in illustrating the construction and operation of the embodiment of the invention shown in FIG. 1.

FIG. 5 is another partial cutaway perspective view of the device shown in FIG. 1.

FIG. 6 is a section view of an extension member of an alternate embodiment of the invention.

DESCRIPTION OF THE INVENTION

Referring now to the drawings, plumbing device 1 includes a standard "level" device, referred to herein as a carpenter's level. Carpenter's level 3 is typically approximately three to four feet long. Carpenter's level 3 includes 3 vials designated by reference numerals 4, 5 and 6. Vial 5 is used to indicate when the carpenter's level 3 is level by means of an air bubble in a liquid-filled, slightly arcuate tube, as is well known. Vials 4 and 6 are used to determine when carpenter's level 3 is perfectly vertical.

As best seen from the partial cutaway-exploded view of FIG. 4, carpenter's level 3 includes a web 8 having a plurality of handholds 9 therein. A perpendicular flange 11 is attached to one side of web 3 and a second similar opposed flange 12 is attached to the other side of level 3, so that the cross-section of carpenter's level 3 has the appearance of an I-beam. The outer opposed surfaces of flanges 11 and 12 are planar.

In accordance with the present invention, two additional vertical members, namely left extension member 14 and right extension member 16 slidably engage the opposed flat surfaces of flanges 12 and 11, respectively, of carpenter's level 3. As best seen in FIG. 4, the cross section of each of extension members 14 and 16 is generally I-beam shaped. Extension arm 14 has an inner flange 14A and an outer flange 14B.

Similarly, extension member 16 has an inner flange 16A and an outer flange 16B. A channel member 18 has one side wall 18A that slidably engages the flange 12 of carpenter's level 3. A second channel 19 has a side wall 19A that slidably engages the flange 12 of carpenter's level 3 on the opposite side of web 3. The opposite side walls of channels 18 and 19 are attached to the inner sections of flange 14A of left extension member 14, so carpenter's level 3 is vertically slidable within the groove formed by channels 18 and 19 and surface 14A of extension member 14. The planar outer flange surface 14A of left extension member 14 slides against the outer planar surface (not shown) of flange 12 of carpenter's level 3.

Similarly, a channel member 20 has an inner side wall 20A that slidably engages to the inner surface of the inner flange of carpenter's level 3. Channel 20 also has an outer wall 20B that extends along and is attached to the inner surface of flange 16A of extension member 16 so that the outer surface of flange 16A slides smoothly against the flat outer surface of flange 11 of carpenter's level 3. Another channel similar to channel 20, but not shown herein, is attached to the inner surface of flange 16A on the opposed side of the web of extension member 16, and forms the other side of the groove in which flange 11 of carpenter's level 3 slides.

Although channels 18, 19 attached to flange 14A of extension member 14 and channel 20 attached to flange 16A of extension member 16 are shown in the embodiment of the inventions illustrated in the drawings, it is deemed preferable that extension members 14 and 16 have the cross sectional configuration shown in FIG. 6, which includes a web 22, a perpendicular outer flange 23, and a lower flange 24 integrally formed with two L-shaped members 25 and 26, as shown. This forms a wide groove 27 in which either flange 11 or flange 12 of carpenter's level 3 can slide.

Opening 28 is wide enough to accommodate the web 3 of carpenter's rule 3. Preferably, the extension members 14 and 16, having the cross section shown in FIG. 6, are composed of extruded, lightweight aluminum.

Referring to FIGS. 1, 3 and 5, at the upper end of extension arm 16 a horizontal end piece 30 is attached to the web of extension arm 16 by means of suitable rivets or bolts generally designated by reference numeral 32 and a plate 32'. A notch 31 is provided in the lower part of the left end of end piece 30 into which the plumbness measurement device 1 is in the retracted configuration shown in FIG. 1. At the right end of upper end piece 30 an offset portion 33 of end piece 30 extends approximately one inch beyond the flat surface 16B of extension member 16. Arrow 34 illustrates the directions in which extension arm 16 can move vertically relative to carpenter's level 3.

Similarly, a lower end piece 35 is rigidly attached by means of plate 37 and rivets or bolts 36 to the lower end of left extension arm 14. A notch 38 is cut in the upper right end portion of piece 35 to accommodate the lower end portion 39 of right extension member 16 when device 1 is in the retracted configuration shown in FIG. 1. The extreme right end portion of lower end piece 35 extends the same distance (approximately one inch) beyond the plane of surface 16B of extension arm 16 as above-mentioned offset section 33. Dotted line 41 designates an imaginary plane parallel to the plane of flat surface 16B. Arrow 42 indicates the direction in which extension arm 14 can vertically move relative to carpenter's level 3.

In accordance with the present invention, one or more quick release mechanisms such as 44 in FIG. 2 are provided to effectively lock each of extension members 14 and 16 to carpenter's level 3. Referring to FIGS. 2 and 4, each quick release mechanism includes a handle 45 which is connected by means of a bolt and nut 46 to a dog member 47. Dog member 47 includes an arm 47A, an arm 47B, and a hole 47C at the junction of arms 47A and 47B. As indicated by dotted line 49, a bolt (not shown) and a nut 50 pivotally attach dog member 47 by means of hole 51 to one side of web 3 of carpenter's level 3. Similarly, on the opposite side of web 3, a second dog member 53 having an arm 53A and an arm 53B is pivotally connected by means of bolt and nut 54 extending through hole 55 in web 3 and hole 56 to carpenter's level 3. Bolt and nut 58 connect the free end of arm 53A to handle 45. A flared, generally V-shaped piece of steel spring 61 has an outer portion 62. The left end of outer portion 62 fits into a notch 64 that is cut in web 3 along the left edge of hole 9 therein. Two additional adjacent notches 66 are cut in web 3 on either side of notch 64 to accommodate movement of bolts 46 and 58 as handle 45 is pressed against spring 61. As easily seen in FIG. 4, handle 45 consists of a piece of channel material, and the material of web 3 and spring 61 extends into the channel of handle 45. Holes 60A and 60B have counterpart holes which are drilled in the opposite side of handle 45. These holes are drilled in tabs which cause handle 45 to have a somewhat T-shaped appearance.

The operation of quick release mechanism 44 can be best understood with reference to FIG. 2, wherein it can be seen that if the user extends his fingers through opening 9 and presses handle 45 in the direction indicated by arrows 69, handle 45 moves to the left. This causes arms 47A and 53A of dog members 47 and 53 to rotate in the directions indicated by arrows 71 and 72, respectively. This, of course, causes arms 47B and 53B to rotate in the direction indicated by arrows 74 and 75, respectively. It can be seen that with handle 45 pressed as far as it will go to the left against spring 61 (FIG. 4), the extreme ends of arms 53B and 47B no longer engage the flange of right extension arm 16, thereby allowing it to slide freely in the directions indicated by arrow 34 in FIG. 3. However, when handle 45 is not depressed, the force of spring 61 on handle 45 causes dog members 47 and 53 to be rotated in the directions opposite to the respective arrows 74 and 75 in FIG. 2. The resulting forces urge the extreme ends of dog arms 53B and 47B against the flanges (i.e., the channels such as 20) of extension arm 16. Any attempt to slide extension arm 16 in either of the directions indicated by arrow 34 causes one of the two dog members to rotate in a direction that tightens the locking engagement of extension arm 16 with carpenter's level 3. For example, if extension arm 3 is urged upward, the frictional engagement of flange surface 20A (FIG. 2) causes dog arm 53B to rotate in the direction opposite to arrow 75, forcing the free end of dog arm 53 more tightly against surface 20A. Downward motion of extension arm 16 will be resisted in the same manner by rotation of dog arm 47B in the direction opposite to 74, unless handle 45 is depressed in the direction indicated by arrow 69.

A second dog mechanism 77 which is essentially identical to quick release mechanism 44 maintains left extension member 14 locked in fixed relationship with carpenter's level 3 unless its handle is depressed to move the free ends of the dog arms away from surfaces 18A and 19A.

Thus, it can be seen that the two quick release mechanisms 44 and 77 allow a construction worker to very easily extend the plumb measurement device 1 to a length that is considerably greater than twice the length of main body 3. The device remains rigid in its extended configuration, and is easily collapsible to the closed configuration shown in FIG. 1 by simply depressing the two handles such as 45 and sliding the two end pieces 30 and 35 toward each other until each engages the opposed extension member end piece.

The device is extremely useful in "plumbing up" a wall frame structure. The worker simply quickly extends the plumb measurement device to the length of the particular warped stud to be measured by using the quick release mechanisms, positions the upper offset end 33 against the upper end of the stud and places the protruding offset end 40 of the lower end piece 35 against the lower end of the stud to be plumbed. Dotted line 41 represents the surface of a perfectly straight stud. However, dotted line 79 indicates the position of a typical warped stud, the plumbness of which could not be measured accurately by an ordinary flat surface carpenter's level.

The flat surface 81 on the left side of left extension member 14 is perfectly flat, so that it can be used both to "plumb up" door jambs and also to measure them for flatness, so that the jambs can be adjusted by use of shims until they are flat.

Thus, using the single tool described herein, a worker can quickly walk through an entire frame structure and quickly make all of the necessary measurements needed to enable workers to "plumb up" the entire structure, even if a "shed type" roof structure requiring numerous different length vertical studs is required. The same worker can quickly plumb door frames and shim the door jambs until they are flat by using the surface 81.

While the invention has been described with reference to a particular embodiment thereof, those skilled in the art will be able to make various modifications to disclosed structure and method without departing from the true spirit and scope of the invention. It is intended that all apparatus elements and method steps which accomplish substantially the same work in substantially the same way to obtain substantially the same result be encompassed within the scope of the invention.

I claim:

1. An apparatus for measuring plumbness of an elongated, warped vertical member, said apparatus comprising in combination:
    (a) an elongated main body member having parallel opposed flat first and second surfaces;
    (b) a bubble vial attached to said main body member for indicating when said first and second surfaces are precisely vertical;
    (c) an elongated first extension member having an elongated flat third surface slidably engaging said first surface and an elongated fourth surface opposed to said third surface;
    (d) an elongated second extension member having an elongated flat fifth surface slidably engaging said second surface and an elongated sixth surface opposed to said fifth surface;
    (e) first offset means attached to the upper end of said first extension member and extending beyond said sixth surface to an imaginary plane that is parallel to said first surface;
    (f) second offset means attachable to the lower end of said second extension member and extending beyond said sixth surface to said imaginary plane;
    (g) first quick release means connected to said main body member and actuatable for releasably engaging said first extension member to allow sliding of said third surface along said first surface and thereby allow extension of said first extension member to effectively lengthen said apparatus if said first quick release means is actuated and to lock said first extension member relative to said main body member if said first quick release means is not actuated; and
    (h) second quick release means connected to said main body member and actuatable for releasably engaging said second extension member to allow sliding of said fifth surface along said second surface and thereby allow extension of said second extension member to affectively lengthen said apparatus if said second quick release means is actuated and to lock said second extension member to said main body member if said second quick release means is not actuated.

2. The apparatus of claim 1 wherein said main body includes a carpenter's level having an I-beam shaped cross-section, said apparatus further including:
    (i) first guide means connected to said first extension member for engaging said main body member to hold said third surface slidably against said first surface;
    (j) second guide means connected to said second extension member for engaging said main body member to hold said fifth surface slidably against said second surface.

3. The apparatus of claim 2 wherein said main body member has an I-beam shaped cross-section and said first and second extension members also have I-beam shaped cross-sections, said main body member including a first web member and first and second plate members perpendicular to and attached to opposed edges of said first web member, said first extension member including a second web member and third and fourth plate members perpendicular to and attached to opposed edges of said second web member, said second extension member including a third web member and fifth and sixth plate members perpendicular and attached to opposed edges of said third web member.

4. The apparatus of claim 3 wherein said first and second surfaces are respectively disposed on said first and second plate members, said third surface is disposed on said third plate member, and said fifth surface is disposed on said fifth plate member, said first guide means including a first L-shaped flange attached to one side of said third plate member for forming a first groove in which a first side portion of said first plate member slides, a second L-shaped flange attached to a second side of said third plate member for forming a second slot in which a second side portion of said first plate member slides.

5. The apparatus of claim 4 including a third L-shaped flange attached to one side of said fifth plate member for forming a third slot in which a first side portion of said second plate member slides and a fourth L-shaped flange attached to a second side of said fifth plate to form a fourth slot in which a second side portion of said second plate slides.

6. The apparatus of claim 5 wherein said first and second L-shaped guides are integral with said first extension member and said third and fourth L-shaped flanges are integral with said second extension member.

7. The apparatus of claim 6 wherein said first and second extension members and said main body member each have cutaway openings in their respective webs to reduce weight of said apparatus.

8. The apparatus of claim 7 including a first end piece attached to the upper end of said first extension member for extending transversely by said main body member to limit sliding movement of said second extension member, said first offset means being incorporated in said first end piece, said apparatus also including a second end piece attached to the lower end of said second extension member and extending across said main body member to limit sliding movement of said first extension member, said second offset means being incorporated in an end portion of said second end piece.

9. The apparatus of claim 5 wherein said first quick release means includes a movable first handle actuatable by fingers of a user and a first bar connected to said main body member for engaging said first L-shaped flange, and first spring means for biasing said first bar against said first L-shaped flange except when said first handle is actuated.

10. The apparatus of claim 9 wherein said bar is included in a roughly L-shaped dog mechanism having first and second arms and pivotally connected to said first web at the junction of said first and second arms, the free end of said first arm being coupled to said first handle, the free end of said second arm engaging said first L-shaped flange and being urged against said first L-shaped flange in response to said spring means when said first handle is not actuated, actuation of said first handle causing rotation of said first and second arms to move the free end of said second arm away from said first L-shaped flange to thereby release said first extension member from locked relationship with said main body member.

11. The apparatus of claim 10 further including a similar dog mechanism attached to said first handle and disposed on an opposite side of said first handle from said first dog mechanism, whereby said first and second dog mechanisms cooperate to resist movement of said first extension member relative to said main body member in either direction unless said first handle is actuated.

12. The apparatus of claim 11 wherein said second quick release means is substantially similar to said first quick release means.

13. The apparatus of claim 12 wherein said first handle and said spring means are disposed in a cutaway opening in said first web.

* * * * *